United States Patent
Mo et al.

(10) Patent No.: US 9,007,086 B2
(45) Date of Patent: Apr. 14, 2015

(54) VOLTAGE APPLYING DEVICE FOR LCD SUBSTRATE

(75) Inventors: Shengpeng Mo, Shenzhen (CN); Wen-Pin Chiang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 110 days.

(21) Appl. No.: 13/522,701

(22) PCT Filed: Apr. 18, 2012

(86) PCT No.: PCT/CN2012/074239
§ 371 (c)(1),
(2), (4) Date: Jul. 17, 2012

(87) PCT Pub. No.: WO2013/155677
PCT Pub. Date: Oct. 24, 2013

(65) Prior Publication Data
US 2013/0273803 A1    Oct. 17, 2013

(30) Foreign Application Priority Data
Apr. 17, 2012  (CN) .......................... 2012 1 0112149

(51) Int. Cl.
*G01R 31/26*    (2014.01)
*G01R 1/067*    (2006.01)
*G01R 31/00*    (2006.01)
*G09G 3/00*    (2006.01)

(52) U.S. Cl.
CPC ........................................ *G09G 3/00* (2013.01)

(58) Field of Classification Search
None
See application file for complete search history.

(56) References Cited

U.S. PATENT DOCUMENTS

| | | | |
|---|---|---|---|
| 7,436,171 B2 * | 10/2008 | Lou et al. | 324/754.13 |
| 2008/0232939 A1 * | 9/2008 | Parker et al. | 414/225.01 |

* cited by examiner

*Primary Examiner* — Melissa Koval
*Assistant Examiner* — Courtney McDonnough

(57) ABSTRACT

The present invention discloses a voltage applying device for an LCD substrate, and the voltage applying device includes a base, a probe bar, and probe pins. The base includes a first slide rail. The probe bar is movably disposed on the first slide rail of the base, and the probe bar includes a second slide rail. The probe pins are movably disposed on the second slide rail of the probe bar, and the probe pins are utilized to contact a plurality of contact pads of the LCD substrate, so as to apply voltage on the LCD substrate. The voltage applying device of the present invention can overcome a problem of increased costs for a conventional voltage applying device can not be shared.

10 Claims, 4 Drawing Sheets

VOLTAGE APPLYING DEVICE FOR LCD SUBSTRATE

FIELD OF THE INVENTION

The present invention relates to a liquid crystal display (LCD) production technique, and especially to a voltage applying device for an LCD substrate in a photo-alignment process.

BACKGROUND OF THE INVENTION

It is well known in the art that an initial guided angle (pre-tilt angle) of liquid-crystal molecules is determined by an alignment film in a LCD panel. The liquid-crystal molecules are aligned generally by means of a rubbing process for the alignment film. However, since the rubbing process is not easily manipulated, the process of the alignment film requires to be controlled accurately. Therefore, a photo-alignment technique utilizing polymers has been proposed to solve the drawback of the above-mentioned rubbing alignment.

In general, a photo-alignment technique requires blending reactive monomers into an LC layer and applying a predetermined voltage thereto by a voltage applying device. The LC layer is irradiated by ultraviolet (UV) light under the predetermined voltage. The reactive monomers are then polymerized and cured forming a polymer layer simultaneously on substrates at opposite sides of the LC layer.

Referring to FIG. 1, FIG. 1 is a top view schematically illustrating a conventional voltage applying device applying voltage on an active device array substrate. The active device array substrate 10 which performs the photo-alignment has a plurality of pixel array areas 120. Each pixel array area 120 is coupled to an external voltage applying device 20 via curing lines 142 and corresponding curing pads 144 outside the pixel array area 120. The applied predetermined voltage is transmitted through probe pins (not shown) of the voltage applying device 20 and electrically contacting the curing pads 144, and then the voltage is transmitted to the pixel array areas 120 via the curing lines 142.

However, the probe pins are held by a probe bar 210 (as shown by dashed lines for clarity), and the probe bar 210 is fixed by locking the probe bar 210 onto hole positions 221 of the base 220 around the substrate 10 in the conventional voltage applying device 20. Thus, the probe bar 210 is fixed on the base 220 and can not be adjusted arbitrarily, and a pitch of the probe pins is also fixed. When performing the photo-alignment for substrates of various sizes, different voltage applying devices are needed to correspond thereto due to different positions of the curing pads thereon and different pitches therebetween. It can be seen from FIG. 1 that the voltage applying device requires disposing around the active device array substrate 10. Therefore, multiple voltage applying devices are needed to be bought, this results costs increase. Moreover, in time of replacing the voltage applying devices, there requires manpower to disassemble, and the probe pins can easily be damaged. This should add costs to production.

In summary, the problem that the voltage applying device can not correspond to various LCD substrates for causing increased costs in the prior art needs to be solved.

SUMMARY OF THE INVENTION

An objective of the present invention is to provide a voltage applying device for an LCD substrate which can solve the problem that the conventional voltage applying device can not correspond to various LCD substrates.

To achieve the foregoing objective, the present invention provides a voltage applying device for an LCD substrate, which includes a base, a probe bar, and a plurality of probe pins. The base includes a first slide rail. The probe bar is movably disposed on the first slide rail of the base, and the probe bar includes a second slide rail. The probe pins are movably disposed on the second slide rail of the probe bar, and the probe pins are utilized to contact a plurality of contact pads of the LCD substrate, so as to apply voltage on the LCD substrate.

In the voltage applying device of the present invention, the probe bar can be fixed at an arbitrary position on the first slide rail. In addition, the probe bar further includes a bottom groove mating to the first slide rail.

In the voltage applying device of the present invention, the probe bar further includes a slide groove which is disposed on a top of the probe bar, and the second slide rail is disposed in the slide groove.

In the voltage applying device of the present invention, the probe pins can be fixed at a plurality of predetermined positions in the slide groove. More specifically, the predetermined positions correspond to positions of the contact pads in a one-to-one manner.

In the voltage applying device of the present invention, the probe bar further includes a locking mechanism, which is utilized to clamp the probe pins for fixing the probe pins in the slide groove. In addition, each of the probe pins includes a fixing block, and the probe pin is fixed in the slide groove through the locking mechanism clamping the fixing block. In one preferred embodiment, the locking mechanism includes a rotation part and a screw rod.

In the voltage applying device of the present invention, the base is disposed around the LCD substrate.

Compared with the prior art, the first slide rail is disposed on the base, so that the probe bar can be movably fixed at the arbitrary position around the substrate. Accordingly, the problem that the conventional probe bar fixed at the hole positions can not correspond to various positions of the contact pads. Moreover, the second slide rail is disposed on the top of the probe bar, so that the probe pins can be adjusted according to the various pitches and the number of the contact pads, thereby overcoming the problem that the conventional voltage applying device can not be shared for causing the increased costs.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
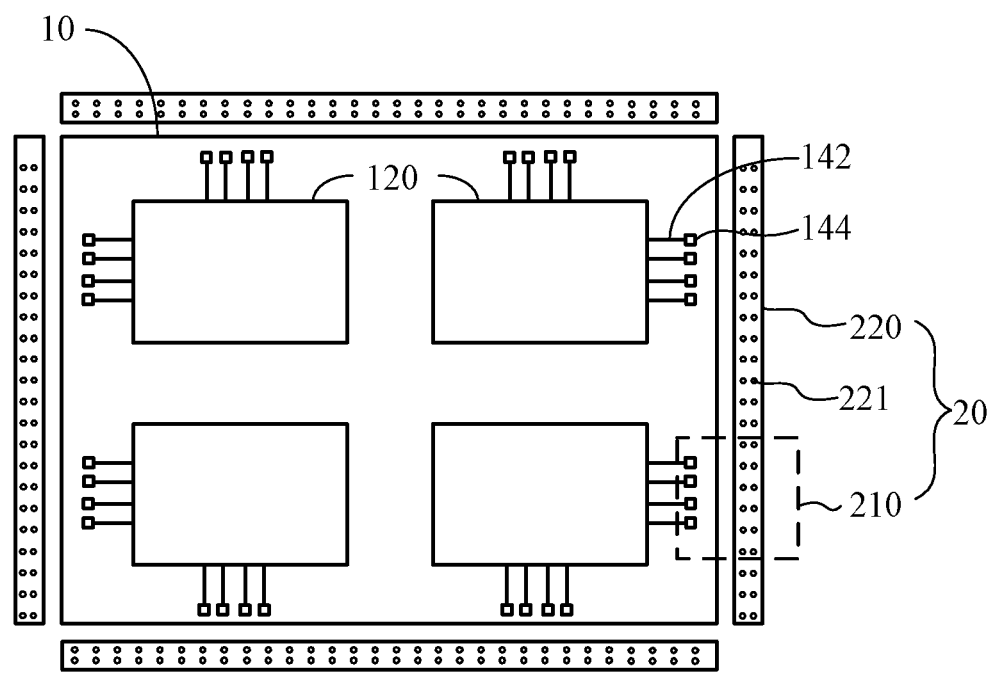
FIG. 1 is a top view schematically illustrating a conventional voltage applying device applying voltage on an active device array substrate.
Figure 2:
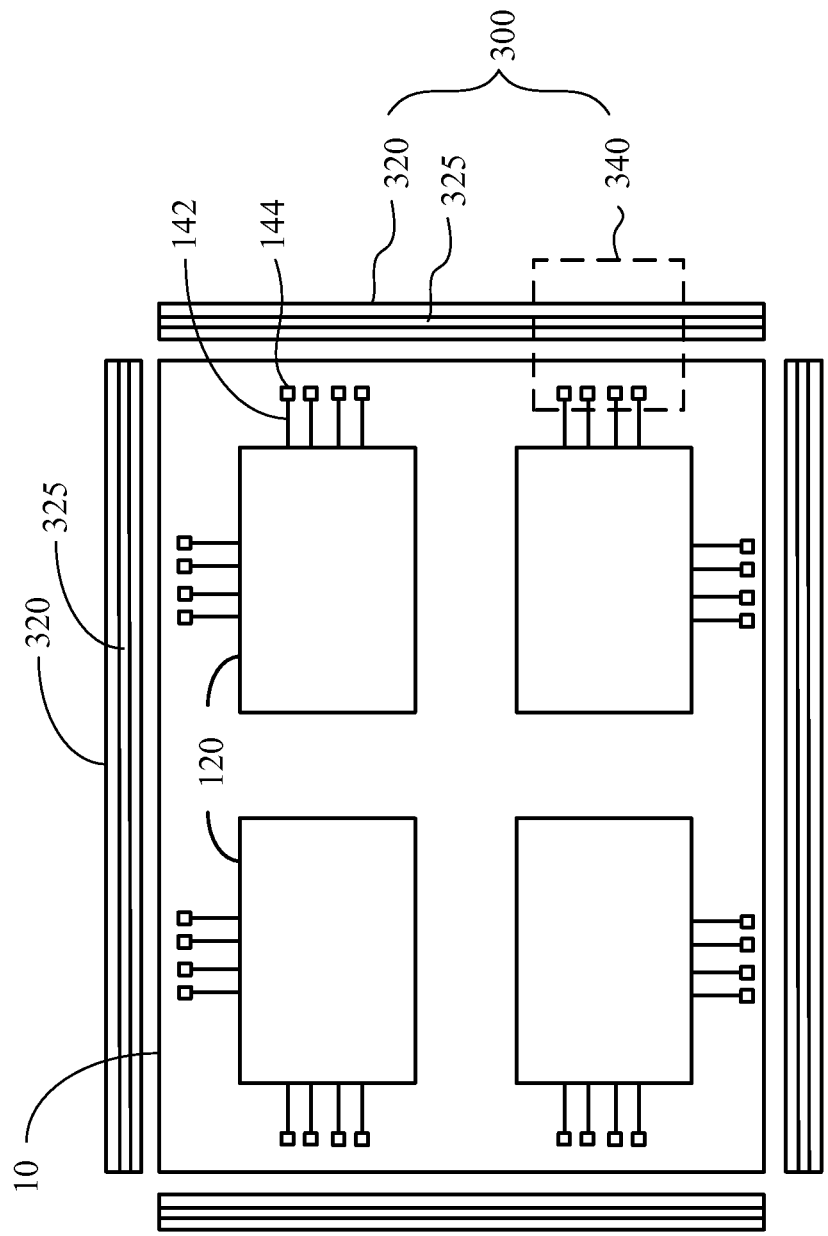
FIG. 2 is a top view schematically illustrating a voltage applying device applying voltage on an LCD substrate according to one preferred embodiment of the present invention.
Figure 3:
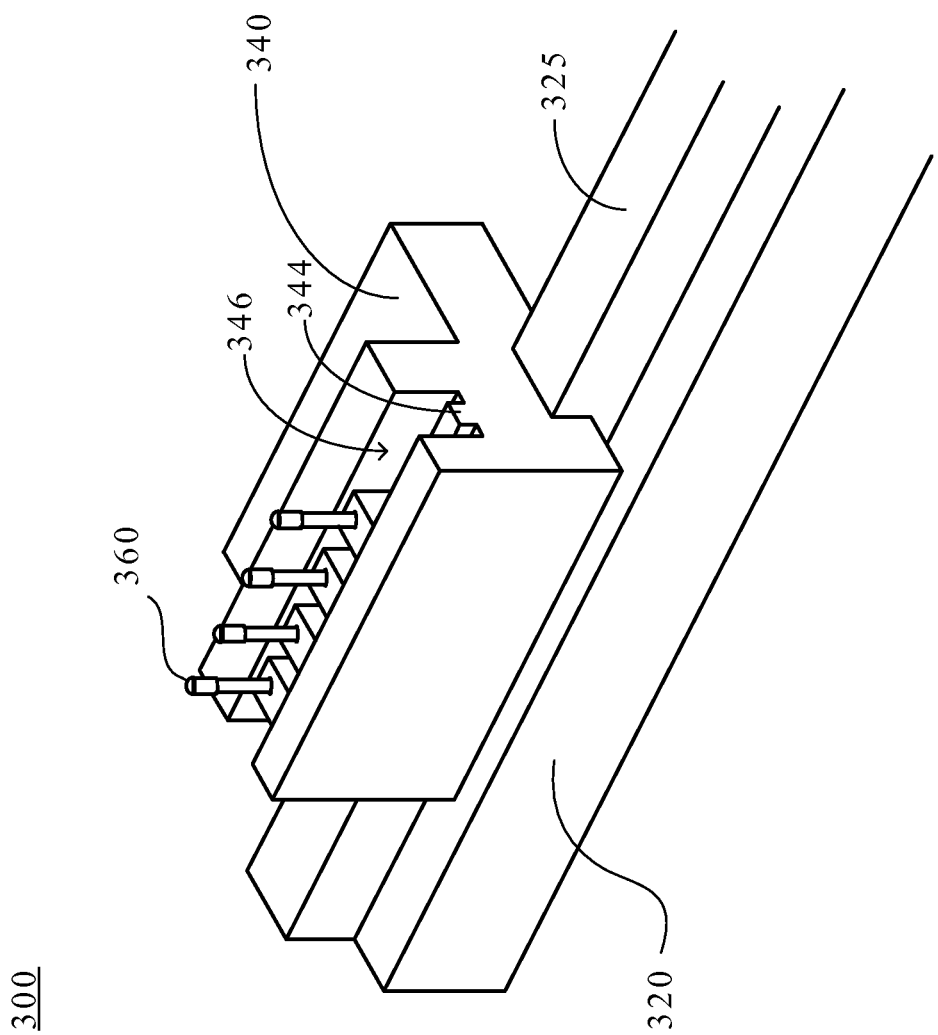
FIG. 3 is a partial perspective view illustrating the voltage applying device according to the preferred embodiment of the present invention.

Referring to FIG. 2 and FIG. 3, FIG. 2 is a top view which schematically illustrates a voltage applying device applying voltage on an LCD substrate according to one preferred embodiment of the present invention. FIG. 3 is a partial perspective view illustrating the voltage applying device according to the preferred embodiment of the present invention. The voltage applying device 300 of the embodiment is an apparatus that is utilized to apply a voltage on an LCD substrate during a photo-alignment process. However, the voltage applying device of the present invention can also be used for an LCD inspection machine used after the alignment and an optical inspection machine used at the alignment terminal. As shown in FIG. 3, the voltage applying device 300 for an LCD substrate of the embodiment includes a base 320, a probe bar 340, and a plurality of probe pins.

Specifically, the LCD substrate is a substrate which a color filter substrate and an active device array substrate are glued together and liquid crystal molecules as well as reactive monomers are filled therebetween. In order to explain clearly, the LCD substrate shown in FIG. 2 is depicted only as an active device array substrate 10. Similarly, the active device array substrate 10 has a plurality of pixel array areas 120. Each pixel array area 120 is coupled to a voltage applying device 300 of the embodiment via the curing lines 142 and corresponding curing pads 144 outside the pixel array area 120.

In the embodiment, both substrates are combined in a manner that the active device array substrate 10 is positioned at an upper layer and the color filter substrate is positioned at a lower layer, so that the active devices on the active device array substrate 10 are faced down. That is, the curing pads 144 are downwardly exposed. More specifically, the curing pad 144 being downwardly exposed can contact the upward probe pins 360, thereby transmitting the voltage to the LC layers of the pixel array areas 120 via the curing lines 142. However, the probe pins of the voltage applying device in the present invention are not limited to be disposed upwards, and the probe pins that are disposed downwards are also within the scope of the present invention.

Figure 4:
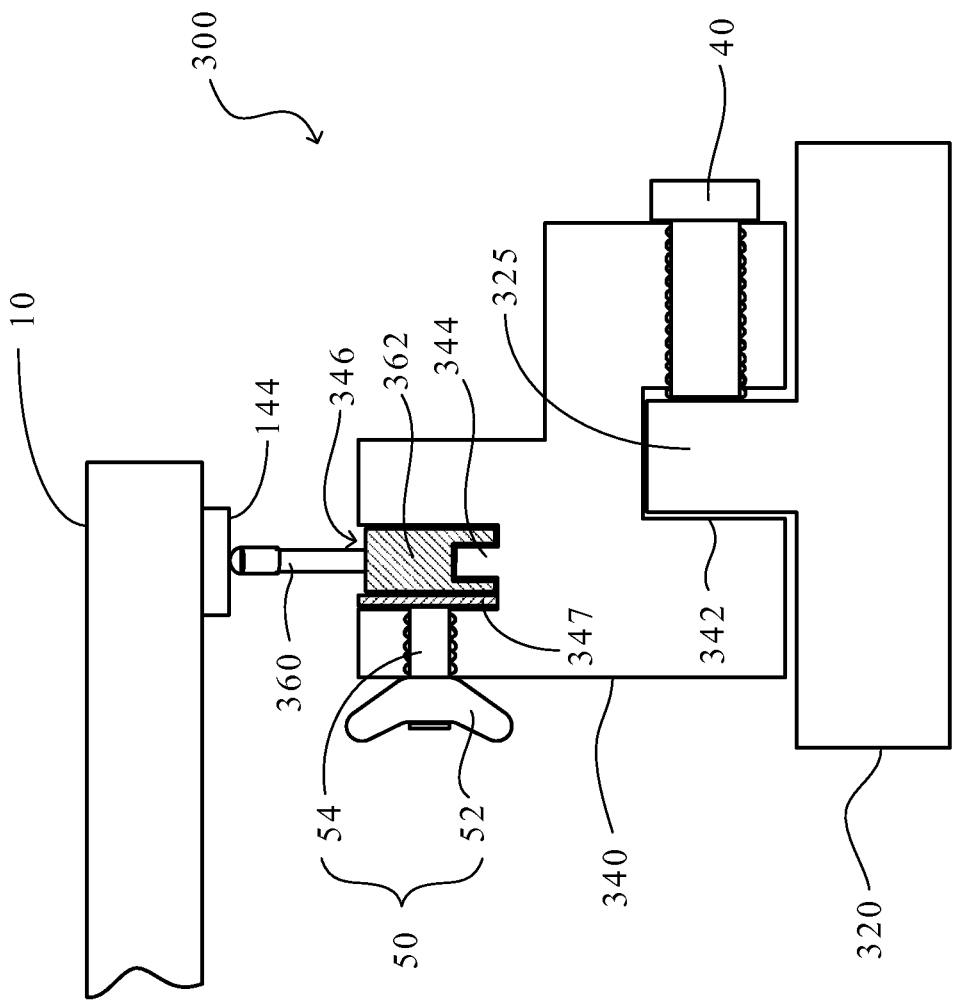
FIG. 4 is a schematic cross-sectional diagram illustrating the voltage applying device 300 according to the preferred embodiment of the present invention.

Referring to FIG. 3 and FIG. 4, FIG. 4 is a schematic cross-sectional diagram illustrating the voltage applying device 300 according to the preferred embodiment of the present invention. The base 320 of the embodiment includes a first slide rail 325, and the probe bar 340 is movably disposed on the first slide rail 325 of the base 320. Specifically, the base 320 is disposed around the LCD substrate (the active device array substrate 10).

Specifically, the first slide rail 325 is a banding bump, and the probe bar 340 further includes a bottom groove 342 mating to the bump of the first slide rail 325. It is worth mentioning that the first slide rail of the base can be a groove and the probe bar can be a bump corresponding to the groove in other embodiments of the present invention. The probe bar 340 of the embodiment of the present invention can slide to an arbitrary position on the first slide rail 325 of the base 320. Thus, when applying a voltage to different substrates with various positions of the curing pads, the probe bar of the present invention overcomes the problem of fixing by hole positions in the prior art, thereby realizing the objective of sharing.

Referring to FIG. 4, the probe bar 340 can be fixed at an arbitrary position on the first slide rail 325. For example, after the probe bar 340 slides to a suitable position corresponding to the curing pads 144, a fixing mechanism can be utilized to fix the probe bar 340 on the first slide rail 325. In the embodiment, the fixing mechanism is a bolt 40 which is disposed on a bottom of the probe bar 340, and the bolt 40 is interconnected to the bottom groove 342 of the probe bar 340. When the probe bar 340 needs to be fixed, the probe bar 340 can be clamped at a suitable position on the first slide rail 325 through the bolt 40.

In the voltage applying device of the present invention, the probe bar 340 further includes a second slide rail 344. The probe pins 360 are movably disposed on the second slide rail 344 of the probe bar 340, and the probe pins 360 are utilized to contact a plurality of contact pads of the LCD substrate, so as to apply a voltage on the LCD substrate. As shown in FIG. 4, the probe pins 360 are utilized to contact the plurality of curing pads 144 of the active device array substrate for transmitting the voltage.

Referring to FIG. 3 and FIG. 4, specifically, the probe bar 340 further includes a slide groove which is disposed on a top of the probe bar, and the second slide rail is disposed in the slide groove. When the probe bar 340 is fixed at the suitable position on the first slide rail 325, the probe pins 360 can be fixed at a plurality of predetermined positions in the slide groove 346. More specifically, the predetermined positions correspond to positions of the contact pads (i.e. the curing pads 144 of the embodiment) in a one-to-one manner. Therefore, when applying the voltage on different substrates with the curing pads having various pitches, the probe bar of the present invention overcomes the problem that the pitches of the probe pins are all fixed in the prior art. It is worth mentioning that the probe pins 360 can be configured to have not only various pitches but also various numbers, so as to achieve the objective of sharing.

Similarly, the probe bar 340 further includes a locking mechanism 50. When the probe pins 360 are placed at suitable positions on the second slide rail 344, the locking mechanism is utilized to clamp the probe pins 360 for fixing the probe pins 360 in the slide groove 346. As shown in FIG. 3 and FIG. 4, each probe pin 360 includes a fixing block 362. The fixing block 362 is disposed at a root of the probe pin 360, the fixing block 362

In the preferred embodiment, the locking mechanism includes a rotation part (wing nut) 52 and a screw rod 54. The screw rod 54 is interconnected to the slide groove 346 of the probe bar 340. When the fixing blocks 362 need to be fixed, the fixing blocks 362 can be clamped at suitable positions in the slide groove 346 through the screw bolt 54 by the rotation part 52. It should be noted that the locking mechanism 50 of the embodiment further includes a banding push plate 347. The banding push plate 347 is disposed in the slide groove 346. When the fixing blocks 362 needs to be fixed, the screw rod 54 can push against the banding push plate 347 by rotating the rotation part 52. Thus, the banding push plate 347 can clamp the plurality of fixing blocks 362 at the same time for simultaneously fixing the probe pins 360. Moreover, the locking mechanism 50 can also be implemented by others, such as screw bolts and so on.

From the foregoing, the first slide rail 325 is disposed on the base 320 in the voltage applying device 300 of the present invention for the LCD substrate, so that the probe bar 340 can be movably fixed at the arbitrary position around the substrate. Accordingly, the problem that the conventional probe bar fixed at the hole positions can not correspond to various positions of the contact pads. In addition, the second slide rail 344 is disposed on the top of the probe bar 340, so that the probe pins 360 can be adjusted according to the various pitches and the number of the contact pads, thereby overcoming the problem that the conventional voltage applying device can not be shared for causing the increased costs.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A voltage applying device for an LCD substrate in a photo-alignment process, comprising:
   a base having a first slide rail which is disposed on a top of the base;
   a probe bar being movably disposed on the first slide rail of the base, the probe bar comprising a second slide rail and further comprising a slide groove disposed on a top of the probe bar, the second slide rail disposed in the slide groove; and
   a plurality of probe pins being movably disposed on the second slide rail in the slide groove, respectively, the probe pins being utilized for contacting a plurality of curing pads of the LCD substrate, so as to apply voltage on the LCD substrate,
   wherein each of the probe pins is independently slidable in the same direction as the probe bar.

2. The voltage applying device according to claim 1, wherein the probe bar can be fixed at an arbitrary position on the first slide rail.

3. The voltage applying device according to claim 1, wherein the probe bar further comprises a bottom groove mating to the first slide rail.

4. The voltage applying device according to claim 1, wherein the probe pins can be fixed at a plurality of predetermined positions in the slide groove.

5. The voltage applying device according to claim 4, wherein the predetermined positions correspond to positions of the curing pads in a one-to-one manner.

6. The voltage applying device according to claim 1, wherein the probe bar further comprises a locking mechanism, which is utilized to clamp the probe pins for fixing the probe pins in the slide groove.

7. The voltage applying device according to claim 6, wherein each of the probe pins comprises a fixing block, and the probe pin is fixed in the slide groove through the locking mechanism for clamping the fixing block.

8. The voltage applying device according to claim 7, wherein the locking mechanism comprises a rotation part and a screw rod.

9. The voltage applying device according to claim 8, wherein the locking mechanism further comprises a banding push plate, which is disposed in the slide groove.

10. The voltage applying device according to claim 1, wherein the base is disposed around the LCD substrate.

* * * * *